(12) United States Patent
Garg et al.

(10) Patent No.: US 10,878,040 B2
(45) Date of Patent: Dec. 29, 2020

(54) REQUEST-DRIVEN FILE PULLING FROM UNSYNCHRONIZED DIRECTORIES

(71) Applicant: Adobe Inc., San Jose, CA (US)

(72) Inventors: Nitin Garg, Faridabad (IN); Devavrat Tomar, Meerut (IN)

(73) Assignee: Adobe Inc., San Jose, CA (US)

( * ) Notice: Subject to any disclaimer, the term of this patent is extended or adjusted under 35 U.S.C. 154(b) by 275 days.

(21) Appl. No.: 15/600,500

(22) Filed: May 19, 2017

(65) Prior Publication Data

US 2018/0336196 A1    Nov. 22, 2018

(51) Int. Cl.
| | |
|---|---|
| G06F 16/93 | (2019.01) |
| H04L 29/08 | (2006.01) |
| G06F 16/10 | (2019.01) |
| G06F 16/182 | (2019.01) |

(52) U.S. Cl.
CPC .............. *G06F 16/93* (2019.01); *G06F 16/10* (2019.01); *G06F 16/182* (2019.01); *H04L 67/1097* (2013.01); *G06F 16/183* (2019.01); *H04L 67/1002* (2013.01); *H04L 67/1019* (2013.01)

(58) Field of Classification Search
CPC ........ G06F 16/93; G06F 16/182; G06F 16/10; G06F 16/183; H04L 67/1097; H04L 67/1002; H04L 67/1019
See application file for complete search history.

(56) References Cited

U.S. PATENT DOCUMENTS

| | | | | |
|---|---|---|---|---|
| 2013/0268480 | A1* | 10/2013 | Dorman | G06F 16/1787 707/608 |
| 2013/0282657 | A1* | 10/2013 | Besen | G06F 16/1844 707/625 |
| 2014/0006350 | A1* | 1/2014 | Fukui | G06F 16/192 707/632 |
| 2014/0173230 | A1* | 6/2014 | Smith | H04L 67/1095 711/162 |
| 2014/0330776 | A1* | 11/2014 | Chen | H04L 67/00 707/610 |
| 2017/0149885 | A1* | 5/2017 | Kaplan | G06F 16/178 |
| 2017/0308547 | A1* | 10/2017 | Gupta | G06F 16/178 |
| 2018/0004831 | A1* | 1/2018 | Smith | G06F 16/27 |
| 2018/0113878 | A1* | 4/2018 | Duggal | G06F 16/178 |

* cited by examiner

*Primary Examiner* — Philip J Chea
*Assistant Examiner* — Robert B McAdams
(74) *Attorney, Agent, or Firm* — SBMC

(57) ABSTRACT

Request-driven file pulling from unsynchronized directories is described. Rather than maintaining entire files, a service provider merely maintains file tags which describe the files in unsynchronized directories of devices associated with a user and communicates the file tags to the devices. The file tags enable indications of the files to be presented so that selected files can be pulled from the unsynchronized directories. Based on user selections made at a first of the devices to pull files from a second of the devices, requests are communicated from the first device to the service provider for the selected files. Responsive to a request, the service provider communicates an indication to the second device to copy the selected file from the second device's unsynchronized directory to a synchronized directory. Responsive to this, the service provider obtains the file from the synchronized directory and delivers the file to the first device.

20 Claims, 10 Drawing Sheets

REQUEST-DRIVEN FILE PULLING FROM UNSYNCHRONIZED DIRECTORIES

BACKGROUND

Advances in computing technology enable users to access their files (e.g., editable content, documents, and so on) from multiple different devices. By way of example, synchronization services allow a user to create a new file on a first device and save the file to a particular "cloud storage" folder associated with a synchronization service. In general, files in "cloud storage" folders are uploaded to the synchronization service, e.g., producing a "server" copy of the file. Later, the user is able to access the file via a "cloud storage" folder on a different, second device. Typically, this involves pulling a copy of the file from the synchronization service to the cloud storage folder on the second device or the synchronization service pushing a copy of the file to the second device's cloud storage folder.

At that point, the user can interact with the file by accessing it from the second device's cloud storage folder. Using functionality of the second device, for instance, the user may make modifications to the file, e.g., further edits to editable content or a document. The user may then select an option to save these modifications. Responsive to this, the modifications are propagated to the server copy of the file. These changes are further propagated to the file at the first device, such that if the user next accesses the file from the first device, the user will be able to interact with a version of the file having the modifications made at the second device.

Such conventional techniques for enabling cross-device file access have drawbacks, however. For example, these techniques may depend on manual user selection to place or save the file in a synchronization folder, e.g., a cloud storage folder. Additionally, storing each of the files designated for synchronization in storage of the synchronization service may require vast amounts of storage. This is due, at least in part, to the sheer number of users leveraging such services. It can also be due to the number and size of files that users designate for storage with synchronization services. Accordingly, conventional techniques for cross-device file access may not only depend on foresight of human users, e.g., to place or save the file in the synchronization folder for use at different devices, but may also impose a significant burden on computing resources, e.g., in terms of storage.

SUMMARY

To overcome these problems, request-driven file pulling from unsynchronized directories is implemented in a digital medium environment. Rather than maintaining entire files, a service provider merely maintains file tags, which describe files in unsynchronized directories of devices associated with a user, and communicates the file tags to the devices. The file tags enable indications of the files to be presented for selection to pull the selected files from the unsynchronized directories. Based on a user selection made at a first of the devices to pull a file from a second of the devices, for instance, a request is communicated from the first device to the service provider for the selected file. Responsive to this request, the service provider communicates an indication to the second device to copy the selected file from the second device's unsynchronized directory to a synchronized directory. Responsive to this, the service provider obtains the file from the synchronized directory and delivers the file to the first device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
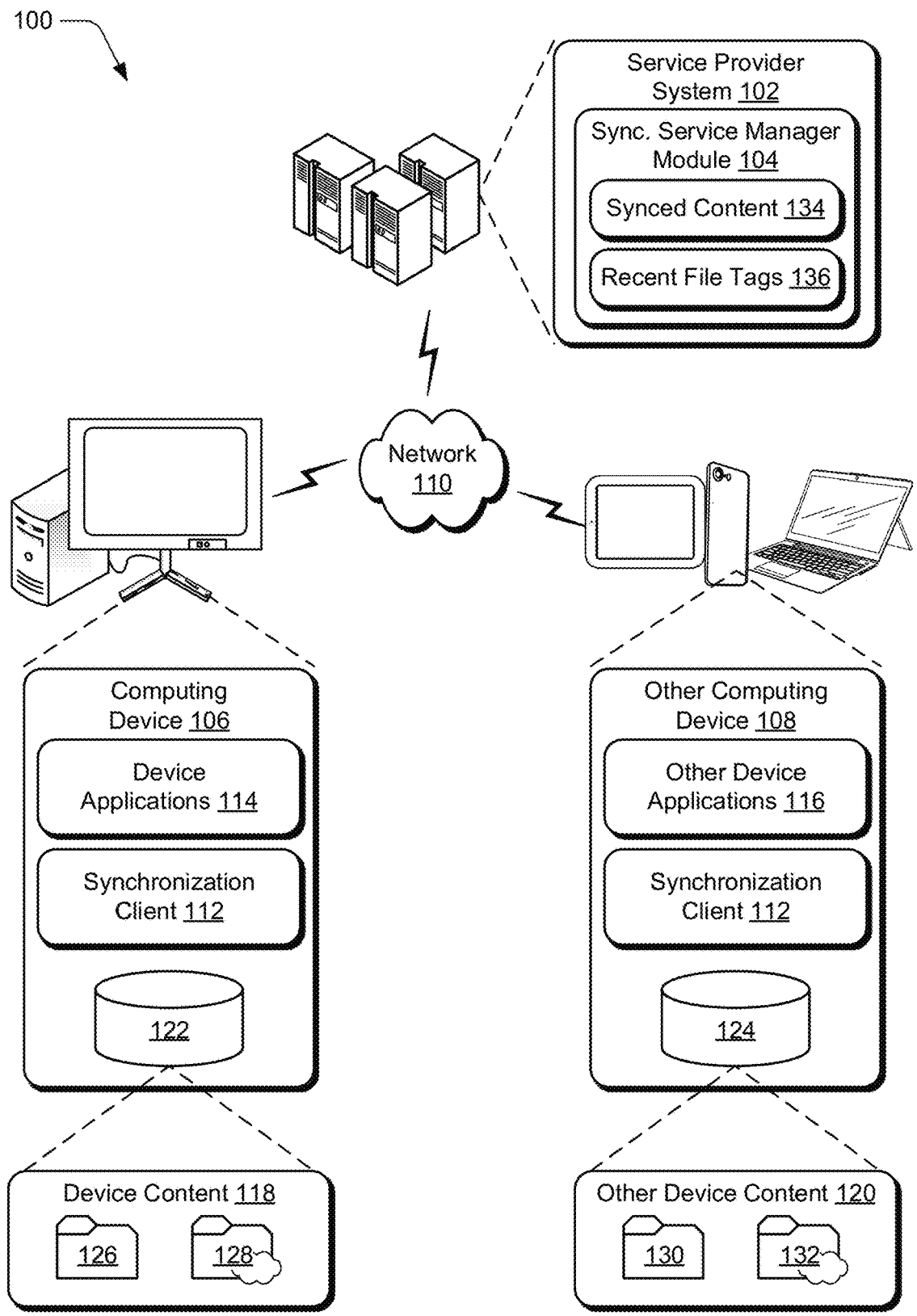
FIG. 1 is an illustration of an environment in an example implementation that is operable to employ techniques described herein.

Advances in computing technology enable users to access their files (e.g., editable content, documents, and so on) across multiple different devices. However, conventional techniques for enabling cross-device file access have drawbacks. For example, conventional techniques may depend on manual user selection to place or save files in a synchronized folder, e.g., a cloud storage folder. Additionally, storing each file designated for synchronization in storage of a synchronization service may require vast amounts of storage. This is due, at least in part, to the sheer number of users leveraging such services. It can also be due to the number and size of files that users designate for storage with synchronization services. Accordingly, conventional techniques for cross-device file access may not only depend on foresight of human users, e.g., to place or save their files in a synchronized folder for use at different devices, but may also impose a significant burden on computing resources, e.g., in terms of storage.

To overcome these problems, request-driven file pulling from unsynchronized directories is implemented in a digital medium environment. In one or more implementations, file tags are used to enable a user to pull files from an unsynchronized directory of a first device of the user to a second device of the user. In contrast to synchronized directories, the files of the unsynchronized directory are not synchronized with files maintained by a synchronization service. Instead, a service that enables file pulling across devices from the unsynchronized directory may maintain limited information about the files in the unsynchronized directory.

In accordance with the described techniques, this limited information is configured as file tags that describe the files. In general, a file tag generated for a file is far less data than the actual file the tag describes. In one or more implementations, file tags are metadata that is associated with a respective file and representative of a variety of different attributes for which values can be set to describe the file. By way of example, a file tag may include attributes such as a user identifier, a file identifier, a file name, a device identifier, a device name, a file path, a product code, a timestamp, and other metadata. In the case of a video file, for instance, metadata indicative of these attributes is far less data than the actual video file. By maintaining these file tags rather than entire files, the data storage burden on synchronization services may be reduced.

The described techniques involve communicating the file tags to devices, such as a first of a user's devices. This enables files to be pulled to the first device from other devices of the user. Similarly, the file tags are also communicated to the other devices to enable files to be pulled from the first device. In any case, information can be extracted from the file tags to present a user interface (or user interface component) at the first device that indicates the files that are available for pulling from unsynchronized directories of the other devices. The user interface also allows the user to select a presented file for pulling to the first device from the unsynchronized directories of a respective device where the selected file is located. It should be noted that at this point there is no "server" copy of the selected file. Instead, the selected file is merely maintained in an unsynchronized directory at one of the user's devices.

Responsive to the selection, however, a request for the file is generated, after which a copy of the selected may be stored at the server, at least temporarily. The generated request is communicated to the synchronization service. Based on the request, the synchronization service sends an indication to the user's other device having the file that indicates to deposit a copy of the file in a synchronization directory of the other device. This indication may include information from the file tag corresponding to the selected file, such as a file path of the selected file that enables the other device to locate the selected file and deposit a copy of the selected file in a synchronization directory. Once the file is copied to the synchronization directory, the other device may push the copy of the file to the synchronization service or the synchronization service may pull the copy from the other device. In any case, the synchronization service obtains a copy of the selected file. In one or more implementations, the synchronization service adds the copy of the file at least temporarily to synchronized content associated with the user. In general, the synchronized content maintained by the synchronization service may be used to synchronize content in synchronized directories across the user's devices, such that when the user adds a file to or edits a file in a synchronized directory of one device, the file is also added to or edited in the synchronized directories of the user's other devices. Regardless, the synchronization service delivers the copy of the selected file to the user's first device. Once the file is delivered, the user may interact with it using the applications of the first device.

By automatically generating file tags and sharing them across devices, the described techniques provide users with cross-device access to more of their recently used files—not simply the files that users manually place in or save to synchronized directories. These techniques thus relieve users of the burden of having to manually place each file they want cross-device access to in a synchronized directory. Moreover, the described techniques enable cross-device access using less data than synchronization techniques where "server" copies of files are maintained. Accordingly, the described techniques may be more convenient for users and impose less of a burden on computing resources than conventional techniques. The described file tags can also be used to reduce a burden on computing resources for file sharing between different users, as described in more detail below.

Term Descriptions

As used herein, the term "unsynchronized directory" refers to a file system location of a computing device that is capable of storing content (e.g., files) and is not synchronized with directories on other devices, such as other devices associated with a user of the computing device. In connection with unsynchronized directories, copies of files maintained in those directories are generally not communicated to a synchronization service and maintained in storage of the synchronization service as "server" copies of the files. Unsynchronized directories and the files maintained therein can be located using file paths that point to a location in a file system of a respective computing device.

In contrast, the term "synchronized directory" is used herein to refer to a file system location of a computing device that is capable of storing content and is synchronized with directories on other devices, such as other devices associated with a user of the computing device. In general, copies of the files maintained in synchronized directories are communicated to a synchronization service and maintained in storage of the synchronization service as "server" copies of the files. As files are added to or edited in a synchronized directory of one device, the synchronization service pushes the added or edited files to synchronized directories of other devices. In this way, devices with connected synchronized directories (e.g., connected based on a user) may have their own local copy of the files in those directories and the synchronization service may further maintain a copy of the files. Synchronized directories and the files maintained therein can also be located using file paths that point to a location in a file system of a respective computing device As used herein, the terms "interact" with and "interaction" with a file refer to any of a variety of ways that users may engage with files. Examples of file interactions can include creating a file, viewing or otherwise consuming a file, modifying a file (e.g., making edits to the file's content), saving modifications to a file, deleting a file, and so on. Users may interact with files in a variety of different ways than those described herein without departing from the spirit or scope of the techniques described herein.

As used herein, the term "server copy" of a file refers to a copy that is maintained by a service provider in storage of the service provider. Server copies of files are maintained in addition to local copies of files, which are maintained in local storage of client devices.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ request-driven file pulling from unsynchronized directories described herein. The illustrated environment 100 includes a service provider system 102 with a synchronization service manager module 104 (SS manager module 104), computing device 106, and other computing device 108. The service provider system 102, the computing device 106, and the other computing device 108 are communicatively coupled, one to another, via a network 110.

Computing devices that are usable to implement the service provider system 102, computing device 106, and other computing device 108 may be configured in a variety of ways. A computing device, for instance, may be configured as a desktop computer, a laptop computer, a mobile device (e.g., assuming a handheld configuration such as a tablet or mobile phone), and so forth. Thus, computing devices may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 9.

As noted above, the service provider system 102 is illustrated as including the SS manager module 104 that is implemented at least partially in hardware of the service provider system 102 to provide services accessible via the network 110 to client devices, such as the computing device 106 and the other computing device 108. In particular, the SS manager module 104 represents functionality to interact with the synchronization client 112 of the computing device 106 and the other computing device 108 to implement request-driven file pulling from unsynchronized directories. The SS manager module 104, for instance, may interact with the synchronization clients 112 to display to a user of the computing device 106 a list of files that have been recently used on different devices associated with the user, e.g., the other computing device 108. In particular, the SS manager module 104 enables the computing device 106 to present files for pulling from unsynchronized directories of the other computing device 108.

Once the files are pulled from the other computing device 108 to the computing device 106, a user can interact with (e.g., open, modify, save, etc.) the pulled files using device applications 114. The other computing device 108 is illustrated with other device applications 116. These enable the user to interact with files via the other computing device 108, such as to interact with files pulled from unsynchronized directories of the computing device 106. The device applications 114 and the other device applications 116 may be configured to include one or more of a variety of different applications, e.g., drawing applications, image-editing applications, audio file editing applications, video editing applications, animation applications, image organizing applications, word processing applications, spreadsheet applications, network-enabled applications, and so on. It is to be appreciated that the device applications 114 may represent a different combination of applications than the other device applications 116. Indeed, some of the other device applications 116 may include more, fewer, and/or different applications than the device applications 114.

In the illustrated example, the computing device 106 and the other computing device 108 include device content 118 and other device content 120, respectively. The device content 118 is illustrated stored in storage 122 of the computing device 106, and the other device content 120 is illustrated stored in storage 124 of the other computing device 108. In general, the device content 118 and the other device content 120 represent content items that are accessible to a user of the computing device 106 and the other computing device 108, e.g., via the device applications 114 and the other device applications 116. The device content 118 and the other device content 120 can include any of a variety of different content having a variety of different file types, such as images (e.g., .jpeg, .png, .bmp, and so forth), videos, documents, spreadsheets, graphics, code, code projects, proprietary types of content (e.g., Adobe Illustrator files having a .ai file type), and so forth. The device content 118 and the other device content 120 may include a variety of other types of content, having a variety of different file types without departing from the spirit or scope of the techniques described herein.

Additionally, the device content 118 is illustrated with unsynchronized directories 126 and synchronized directories 128. Similarly, the other device content 120 is illustrated with unsynchronized directories 130 and synchronized directories 132. In general, the unsynchronized directories 126, 130 and synchronized directories 128, 132 represent portions of file systems of the computing device 106 and the other computing device 108 in relation to which at least some of the device content 118 and the other device content 120 is arranged. These directories control how the device content 118 and the other device content 120 is maintained and retrieved, enabling the content to be separated into groups that can be named to facilitate operations such as later retrieval. By way of example, some files of the device content 118 may be located in the unsynchronized directories 126 while other files of the device content 118 are located in the synchronized directories 128. The unsynchronized directories 126, 130 and synchronized directories 128, 132 may each be representative of one or more file folders that are configured to contain content files and further file folders (e.g., sub directories).

Nonetheless, the unsynchronized directories 126, 130 are configured differently from the synchronized directories 128, 132. Broadly speaking, the device content 118 of the unsynchronized directories 126 is simply stored in the storage 122 of the computing device 106. Likewise, the other device content 120 of the unsynchronized directories 130 is simply stored in the storage 124 of the other computing device 108. The content in the unsynchronized directories 126, 130 is not synchronized with the SS manager module 104 such that copies of files held in the unsynchronized directories 126, 130 are also held at the service provider system 102. In contrast to the unsynchronized directories 126, 130, the content in the synchronized directories 128, 132 is synchronized by the SS manager module 104.

To facilitate synchronizing the content between the synchronized directories 128, 132, the SS manager module 104 includes or otherwise has access to synchronized content 134 (synced content 134). The synced content 134 represents functionality of the service provider system 102 to maintain in its storage a copy of files in the synchronized directories 128. Consider an example, in which a user of the computing device 106 obtains an image file and saves it to the synchronized directories 128. Based on deposition into the synchronized directories 128, the synchronization client 112 may communicate a copy of the image file over the network 110 to the service provider system 102. The SS manager module 104 may save the copy of the image file in the synced content 134.

The synced content 134 can then be used to synchronize the content of the computing device 106's synchronized directories 128 with the content of the other computing device 108's synchronized directories 132. In the ongoing example with the image file, the SS manager module 104 can communicate the "server" copy of the image file from the synced content 134 over the network 110 to the other computing device 108. The synchronization client 112 of the other computing device 108 can then save the copy of the image file to the synchronized directories 132 or can update an existing copy of the image file in the synchronized directories 132 based on the copy obtained from the SS manager module 104. Regardless of the particular synchronization operations performed, the SS manager module 104 and the synchronization clients 112 interact to synchronize the content of the synchronized directories 128, 132 so that the files in those directories match.

As noted above, the unsynchronized directories 126, 130 are not synchronized in this manner. To present a user of the computing device 106 with a list having recently used files from the unsynchronized directories 130 of the other computing device 108 (and vice versa), however, some information is collected and shared about the files in the unsynchronized directories 130. Rather than obtaining entire files, the synchronization client 112 collects limited information describing the files in the unsynchronized directories 126, 130. In one or more implementations, this information may include a user identifier, a file identifier, a file name, a device identifier, a device name, a file path, a product code, a timestamp, other metadata (e.g., a thumbnail image), and so forth. The file tags may be configured to include metadata indicative this information. From the information, the synchronization client 112 is configured to generate file tags for the files of the unsynchronized directories 126, 130. The synchronization client 112 may generate a file tag, for instance, when a user opens a file in the unsynchronized directories 126 using one of the device applications 114.

Once generated, these file tags can be communicated over the network 110 to the service provider system 102. In the illustrated example, the service provider system 102 includes recent file tags 136, which represent a repository of file tags for recently used files in the unsynchronized directories 126, 130. The SS manager module 104 may include or otherwise have access to these recent file tags 136. In accordance with the described techniques, the term "recently used" and "recent" may refer to a file associated with a timestamp that is within some threshold of a current time, e.g., within the last two weeks, last three weeks, last month, etc. In any case, the recent file tags 136 are simply information describing the files in the unsynchronized directories 126, 130 and are not full copies of those files.

Moreover, the recent file tags 136 are used to implement request-driven file pulling from the unsynchronized directories 126, 130. For example, the recent file tags 136 enable a user of the computing device 106 to request a file from the unsynchronized directories 130 of the other computing device 108, and have the file pulled to the computing device 106, e.g., so that the user can interact with the file via the device applications 114. The recent file tags 136 also enable the user, when using the other computing device 108, to request a file from the unsynchronized directories 126 of the computing device 106 and have the requested file pulled to the other computing device 108.

To enable this pulling, the SS manager module 104 can communicate the recent file tags 136 or a portion of the recent file tags 136 to the computing device 106 and the other computing device 108. For instance, the SS manager module 104 can communicate the recent file tags 136 that are associated with the files in the unsynchronized directories 130 to the computing device 106. Similarly, the SS manager module 104 can communicate the recent file tags 136 that are associated with the files in the unsynchronized directories 126 to the other computing device 108. Accordingly, the computing device 106 has a list of files that a user recently used at other associated computing devices. The device applications 114 that are configured to leverage the recent file tags 136 may present a list of files recently used at the associated computing devices, e.g., when the user selects an option in an application to open a file.

In accordance with the described techniques, an entire file is not pulled from an unsynchronized directory until after being requested by a user. Consider an example in which a user of the computing device 106 is presented indications for recently used files in the unsynchronized directories 130 of the other computing device 108 and in which the user selects one of the indications to request a corresponding file. After this selection, the synchronization client 112 of the computing device 106 may communicate a request to the SS manager module 104. The SS manager module 104 may forward the request to the other computing device 108. When the request is received, the synchronization client 112 of the other computing device 108 can initiate pulling of the file, e.g., by copying the requested file from the unsynchronized directories 130 to the synchronized directories 132. Once deposited in the synchronized directories 132, the requested file is then synchronized such that a copy of the requested file is uploaded to the service provider system 102 and then communicated further to the computing device 106. The synchronization client 112 of the computing device 106 may obtain the requested file from the service provider system 102 and deposit the requested file in the synchronized directories 128. The user of the computing device 106 may then use the device applications 114 to access the requested file from the synchronized directories 128, e.g., to view, open, modify, and/or save the file. The user of the computing device 106 may also move the file to the unsynchronized directories 126 of the computing device 106.

By automatically generating the described file tags and sharing them across devices, the described techniques provide users with cross-device access to more of their recently used files—not simply the files that users manually place in or save to synchronization directories such as the synchronized directories 128, 132. These techniques thus relieve users of the burden of having to manually place each file they want to be able to access across devices in a synchronization directory. Moreover, the described techniques enable cross-device access using less data than synchronization techniques where "server" copies of files are maintained. Indeed, a recent file tag 136 comprising metadata for attributes describing a file can correspond to significantly less data than the actual file being described. Accordingly, the described techniques may be more convenient for users and impose less of a burden on computing resources (e.g., in terms of file storage at the service provider system 102) than conventional techniques.

Having considered an example environment, consider now a discussion of some example details of the techniques for request-driven file pulling from unsynchronized directories in accordance with one or more implementations.

Request-Driven File Pulling from Unsynchronized Directories

Figure 2:
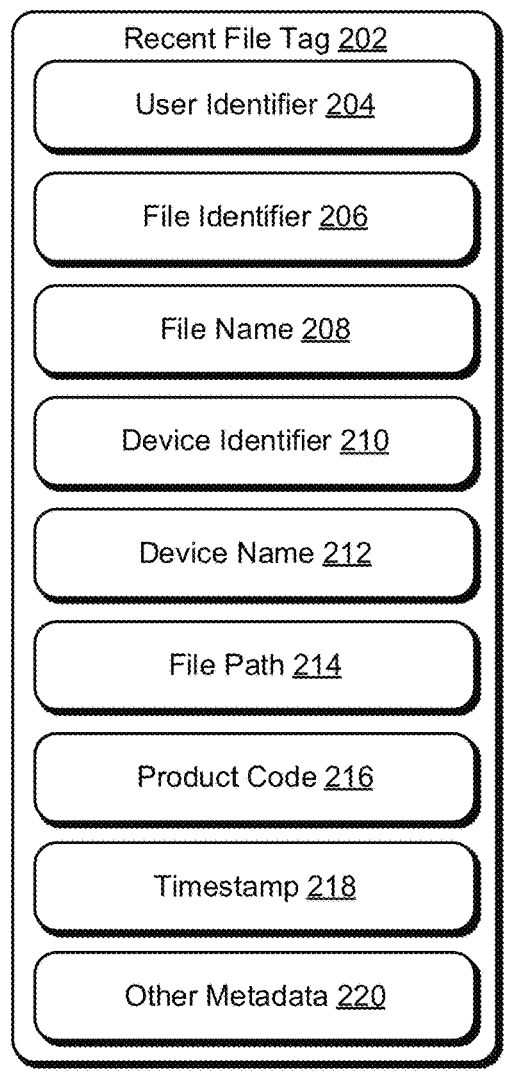
FIG. 2 depicts an example data structure that is usable to implement a schema for a recent file tag repository.

FIG. 2 depicts an example 200 of a data structure that is usable to implement a schema for a recent file tag repository. The schema defines the information that is collected about files in unsynchronized folders or inclusion in a repository of recent file tags, e.g., to enable the files to be pulled from the unsynchronized directories upon request. As an example, consider recent file tag 202 of the illustrated example 200.

The recent file tag 202 is depicted having user identifier 204, file identifier 206, file name 208, device identifier 210, device name 212, file path 214, product code 216, timestamp 218, and other metadata 220. In general, these attributes indicate different information capable of describing a particular file so that the synchronization clients 112 and the SS manager module 104 can cause an indication of the file to be presented on one device and the file to be pulled upon request from an unsynchronized directory of another device. Although the recent file tag 202 is illustrated with the attributes described above and below, the described techniques may be implemented using file tags having different combinations of attributes without departing from the spirit or scope of the techniques described herein.

Broadly speaking, the synchronization client 112 generates a recent file tag 202 when a file is accessed, e.g., from one of the unsynchronized directories 126, 130. The synchronization client 112 may generate the recent file tag 202 when an application creates a file, opens a file, modifies a file, saves changes to a file, and so forth. Regardless of when the recent file tag 202 is generated, the synchronization client 112 may collect information corresponding to each of the attributes in relation to a most recent access of the file, such that the timestamp is indicative of the most recent access. In the following discussion of the attributes, consider a scenario in which an image file named "CoverPage.jpeg" is modified by a user of the computing device 106, an image editing application of the computing device 106 is used to make the modifications, and the image file is saved in the unsynchronized directories 126.

In one or more implementations, the user identifier 204 identifies a user that accessed the particular file for which the recent file tag 202 is generated. In the context of the described scenario, the user identifier 204 identifies a user of the computing device 106. The synchronization client 112 may collect information from the computing device 106's operating system that indicates a username or some unique user identifier. Based on the collected information, the synchronization client 112 can set a value for the user identifier 204.

The file identifier 206 identifies the file for which the recent file tag 202 is generated. In relation to the described scenario, the file identifier 206 may correspond to a unique identifier that identifies the image file named "CoverPage.jpeg." In one or more implementations, the file identifier 206 may be configured as one of a universally unique identifier (UUID), a globally unique identifier (GUID), and so on. The synchronization client 112 may collect information from the operating system of the computing device 106 that indicates the file identifier or may extract the information from the file. The synchronization client 112 can then set the value of the file identifier 206 to correspond to the collected identifier.

The file name 208 indicates a name of the file for which the recent file tag 202 is generated. In the continuing scenario, the file name 208 may be configured as a text string corresponding to the sequence of characters "CoverPage.jpeg." The synchronization client 112 may extract this information from the image file, obtain it from the operating system of the computing device 106, and so forth.

The device identifier 210 identifies the device that accesses the file to cause generation of the recent file tag 202. The device identifier 210 identifies the device where the file is located in an unsynchronized directory. In the continuing scenario, the device identifier may correspond to a unique identifier that identifies the computing device 106. Like the file identifier 206, the device identifier 210 may be configured as one of a universally unique identifier (UUID), a globally unique identifier (GUID), and so on. The synchronization client 112 may collect this information from the operating system of the computing device 106 or some other source configured to provide an identifier that uniquely identifies the computing device 106.

The device name 212 indicates a name of the device that accesses the file to cause generation of the recent file tag 202. In the continuing example, the computing device 106 may be associated with the name "NITINS_WK_CPU." Accordingly, the device name 212 may be configured as a text string corresponding to the sequence of characters "NITINS_WK_CPU." The synchronization client 112 may collect this information from the operating system of the computing device 106 or some other source configured to provide a name associated with the computing device 106.

The file path 214 specifies a unique location of the file for which the recent file tag 202 is generated. In particular, the file path 214 specifies the unique location of the file at the computing device where the file is maintained. The file path 214 may be configured to point to a file system location of the pertinent file by following a directory tree hierarchy expressed in a string of characters in which path components, separated by a delimiting character, represent each directory. In one or more implementations, the unique location corresponds to an unsynchronized directory of the computing device. In the continuing scenario, the file path 214 may be configured as a delimiter-separated string that points to one of the unsynchronized directories 126 of the computing device 106 where the image file is located. The synchronization client 112 may extract this information from the image file, obtain it from the operating system of the computing device 106, and so forth.

The product code 216 specifies a product that is used to interact with (e.g., create, view, open, modify, save, etc.) the file where this interaction causes generation of the recent file tag 202. In the continuing scenario, the product code 216 may correspond to the above-mentioned image editing application of the computing device 106. In one or more implementations, the product code 216 may be configured as a sequence of alphanumeric characters that uniquely identifies the product used, though other information capable of indicating applications may be used. For example, the product code 216 may be configured as an SAP code, may include delimiting characters (e.g., '-') in addition to alphanumeric characters, and so forth. The synchronization client 112 may extract this information from the image editing application, extract it from the image file, obtain it from the operating system of the computing device 106 (e.g., from a log file), and so forth.

The timestamp 218 specifies a time of the most recent interaction with the file where this interaction causes generation (or update) of the recent file tag 202. In the continuing scenario, the timestamp 218 corresponds to the time at which the user of the computing device 106 modified the image file "CoverPage.jpeg" using the image editing application. In one or more implementations, the timestamp 218 corresponds to a time a file was most recently interacted with, such that if a user opens a file, then modifies it, and then saves the modifications, the timestamp corresponds to the time the file is saved. It should be appreciated that the timestamp may be associated with other particular actions involved in interacting with files without departing from the spirit or scope of the techniques described herein. In any case, the synchronization client 112 may extract this information from the image file, obtain it from the operating system of the computing device 106, and so forth.

The recent file tag 202 is also illustrated with the other metadata 220 attribute. The other metadata 220 may correspond to a variety of different metadata that may be used to implement aspects of the described techniques without departing from the spirit or scope of the techniques described herein. By way of example, the other metadata 220 may include a thumbnail or data indicating that there is no thumbnail for a particular file, it may include user identifiers of users the identified user has indicated to share the file with, and so forth.

In general, the recent file tags 136 represent a repository of multiple recent file tags 202, which may be updated as a user of the computing device 106 and other computing device 108 interacts with files in the unsynchronized directories 126, 130. Additionally, the information indicated by the different attributes of the file tag 202 enables different aspects of the described techniques as discussed in relation to FIGS. 3-6 below.

Figure 3:
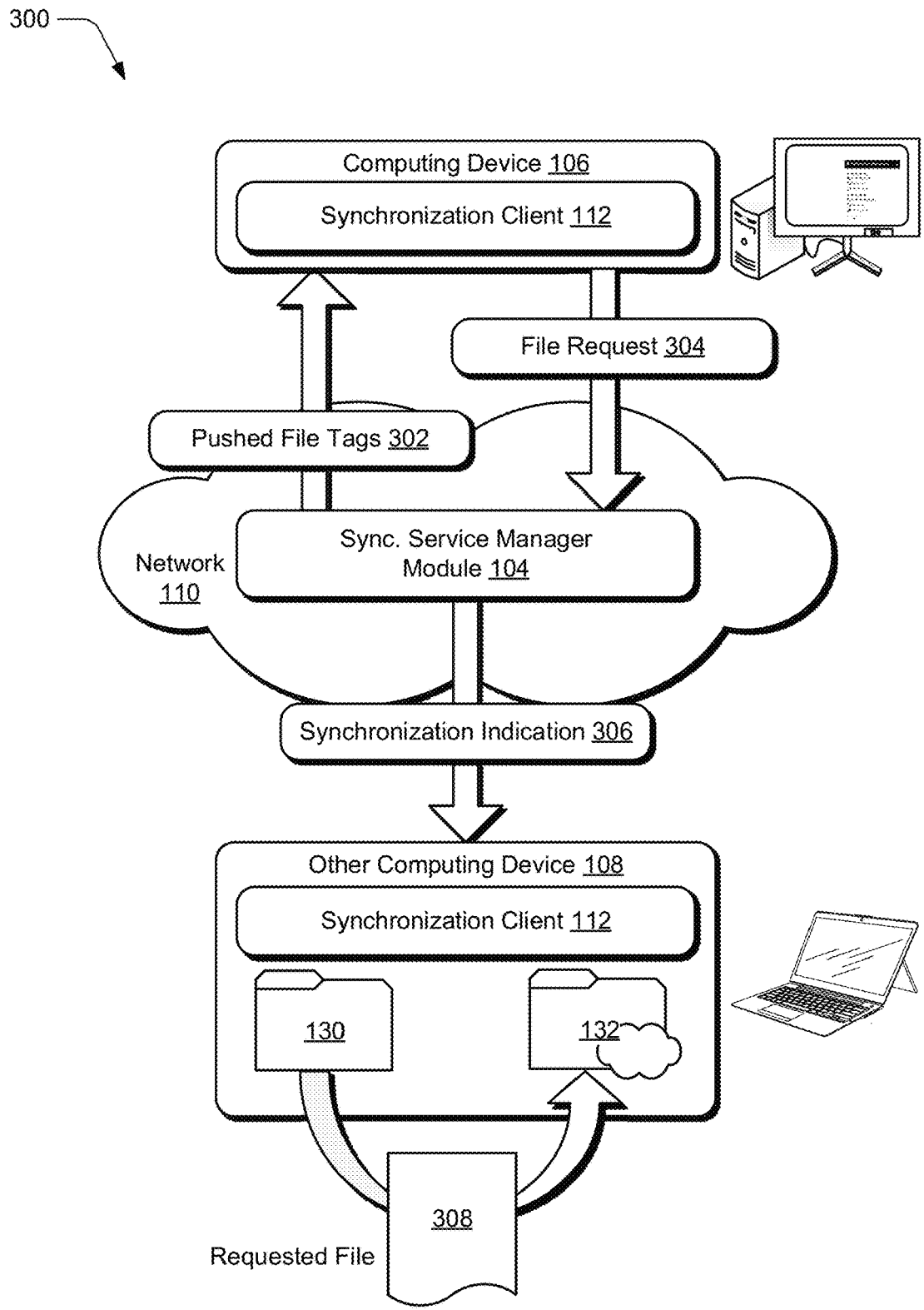
FIG. 3 depicts an example implementation in which a synchronization service manager of FIG. 1 uses recent file tags to enable devices to request files located in unsynchronized directories of other devices.

FIG. 3 depicts an example implementation 300 in which a synchronization service manager of FIG. 1 uses recent file tags to enable devices to request files located in unsynchronized directories of other devices. The illustrated example 300 includes from FIG. 1, the SS manager module 104 and the computing device 106 having the synchronization client 112. The illustrated example 300 also includes the other computing device 108 having the synchronization client 112, the unsynchronized directories 130, and the synchronized directories 132. Further included in the illustrated example 300 is the network 110 as it enables communications between the entities.

In accordance with the described techniques, the illustrated example 300 includes pushed file tags 302. The pushed file tags 302 correspond to at least a portion of the recent file tags 136. The pushed file tags 302 are communicated by the SS manager module 104 to the computing device 106, e.g., over the network 110. The pushed file tags 302 may correspond to the recent file tags 136 for which the device identifier 210 identifies devices other than the computing device 106. For example, the pushed file tags 302 can include the recent file tags 136 of files for which the device identifier identifies the other computing device 108 (and any other computing devices associated with a user of the computing device 106). In some implementations, the pushed file tags 302 may correspond to updates to file tags already pushed to the computing device 106, e.g., the file tags of files interacted with or created since a last time the SS manager module 104 pushed file tags to the computing device 106. Alternately or in addition, the pushed file tags 302 may include tags for each file available for pulling to the computing device 106 from other devices, e.g., from unsynchronized directories of the other computing devices.

The pushed file tags 302 may also correspond to the recent file tags 136 for which the timestamp 218 is within some threshold of a current time. In this way, the pulling may be limited to recently used files. This can be effective to limit the files presented to a user of the computing device 106. In particular, the files presented can be limited to those that are recently used at other devices associated with the user. The number of files presented is limited (e.g., based on the timestamp 218) because presenting each file within the unsynchronized directories of a user's devices may result in a presentation showing so many files that the user may have difficulty finding desired files. Regardless of which recent file tags 136 the SS manager module 104 pushes, the pushed file tags 302 are used to present a list of files at the computing device 106. In particular, the list includes the files that can be pulled from other devices associated with the user, such as the other computing device 108. In this context, consider the example user interface of FIG. 4.

Figure 4:
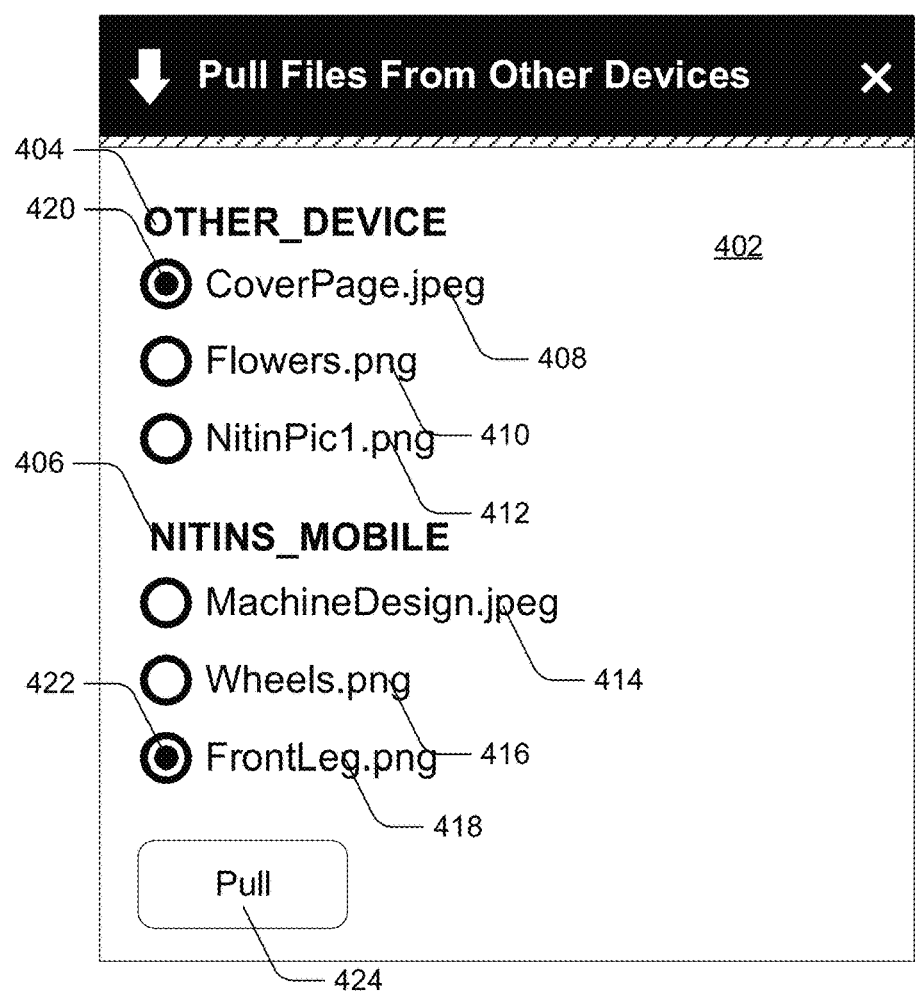
FIG. 4 depicts an example user interface configured to present, at a device, recent files from unsynchronized directories of other devices that can be pulled to the device.

FIG. 4 depicts an example user interface 400 that is configured to present, at a device, recent files from unsynchronized directories of other devices that can be pulled to the device.

The illustrated example 400 includes user interface component 402, which is depicted as a dialog box though other configurations are contemplated in the spirit of the described techniques. The user interface component 402 may be generated based on the pushed file tags 302 and presented responsive to a menu selection in one of the device applications 114. The user interface component 402 may also be generated and presented at the operating-system level rather than application level, e.g., based on a menu selection while navigating through the computing device 106's file system.

In one or more implementations, a list of recently used files in unsynchronized directories of other devices is presented solely in applications that support request-driven file pulling from unsynchronized directories. This means that the applications are configured to process the pushed file tags 302 to present a list of recently used files, such as by generating and presenting the user interface component 402. These applications may also be capable of providing information that enables recent file tag entries to be generated for files.

In one or more implementations, request-driven file pulling from unsynchronized directories can be limited to related applications, such as a suite of applications developed by a developer (e.g., Adobe® Creative Cloud). In such implementations, an application capable of leveraging request-driven file pulling from unsynchronized directories may initiate a request for files having file tags where the product code 216 indicates a related application. The synchronization client 112 may utilize relational metadata to determine which applications are related to the application making the request. In addition or alternately, request driven file pulling from unsynchronized directories may be implemented at the operating system level, such that the synchronization client 112 enables an application running on the operating system to request any recent file from unsynchronized directories of other devices.

Regardless of whether the illustrated user interface component 402 is presented for requesting files modified by related applications or by any application that supports request driven file pulling, the user interface component 402 is depicted having device indications 404, 406 and file indications 408, 410, 412, 414, 416, 418. The device indications 404, 406 indicate the devices from which files indicated by the file indications 410, 412, 414, 416, 418 can be pulled. In accordance with the described techniques, the files indicated by the file indications 408, 410, 412, 414, 416, 418 may be located in unsynchronized directories of the devices indicated by the device indications 404, 406.

The user interface component 402 may be generated based on the pushed file tags 302 insofar as the device indications 404, 406 correspond to values extracted from the device name 212 attribute of the pushed file tags 302. Additionally, the file indications 408, 410, 412, 414, 416, 418 may correspond to values extracted from the file name 208 attribute of the pushed file tags 302. By way of example, the file indication 408, "CoverPage.jpeg," may be extracted from the file name 208 attribute of one of the pushed file tags 302. The device indication 404, "OTHER_DEVICE," may be extracted from the same file tag and indicate the device at which "CoverPage.jpeg" is located in an unsynchronized directory.

In the illustrated example 400, radio buttons 420, 422 are depicted being selected. In general, the radio buttons, including the radio buttons 420, 422, indicate functionality to select a file for pulling from another device. With respect to the illustrated example, a user of the computing device 106 may select the radio buttons 420, 422 in a variety of different ways, such as by clicking on them with a mouse pointer, tapping them with a finger, using keystrokes of a keyboard to select them, and so on. By selecting the radio buttons 420, 422 the user of the computing device 106 can initiate pulling the corresponding files to the computing device 106 by then further selecting pull button 424. The files for which the radio buttons are not selected when the pull button 424 is further selected are not pulled to the computing device 106. User interface components other than radio buttons and a pull button may be used to enable user selection and initiate pulling of selected files without departing from the spirit or scope of the described techniques.

Responsive to selection of the pull button 424, the synchronization client 112 initiates pulling of the selected files (e.g., "CoverPage.jpeg" and "FrontLeg.png") from the unsynchronized directories of the respective devices. In particular, the synchronization client 112 initiates the pulling of "CoverPage.jpeg" from "OTHER_DEVICE" and initiates the pulling of "FrontLeg.png" from "NITINS_MOBILE." To initiate the pulling of the selected files, the synchronization client 112 may generate requests for the files and communicate these requests over the network 110 to the SS manager module 104.

In the context of FIG. 3, selection of the pull button 424 can cause the synchronization client 112 to generate and communicate file request 304 to the SS manager module 104. In this example, the file request 304 indicates files that a user of the computing device 106 has selected to have pulled from the unsynchronized directories 130 of the other computing device 108. Responsive to receiving the file request 304, the SS manager module 104 may generate synchronization indication 306 and communicate it over the network 110 to the other computing device 108. Broadly speaking, the synchronization indication 306 may be configured to indicate to the synchronization client 112 of the other computing device 108 the file that the user of the computing device 106 has requested, e.g., it may include at least the file path 214 from the recent file tag 202 of the requested file. The synchronization indication 306 is also configured to indicate to the synchronization client 112 of the other computing device 108 to initiate synchronization of the requested file. Based on the synchronization indication 306, the synchronization client 112 locates requested file 308 in the unsynchronized directories 130 of the other computing device 108. The synchronization client 112 can then copy the requested file 308 to the synchronized directories 132 of the other computing device 108. Once the requested file 308 is copied to the synchronized directories 132, the synchronization clients 112 and the SS manager module 104 may perform operations to synchronize the synchronized directories 128, 132. Through this synchronizing a copy of the requested file 308 is provided to the computing device 106. In this context, consider the example implementation of FIG. 5.

Figure 5:
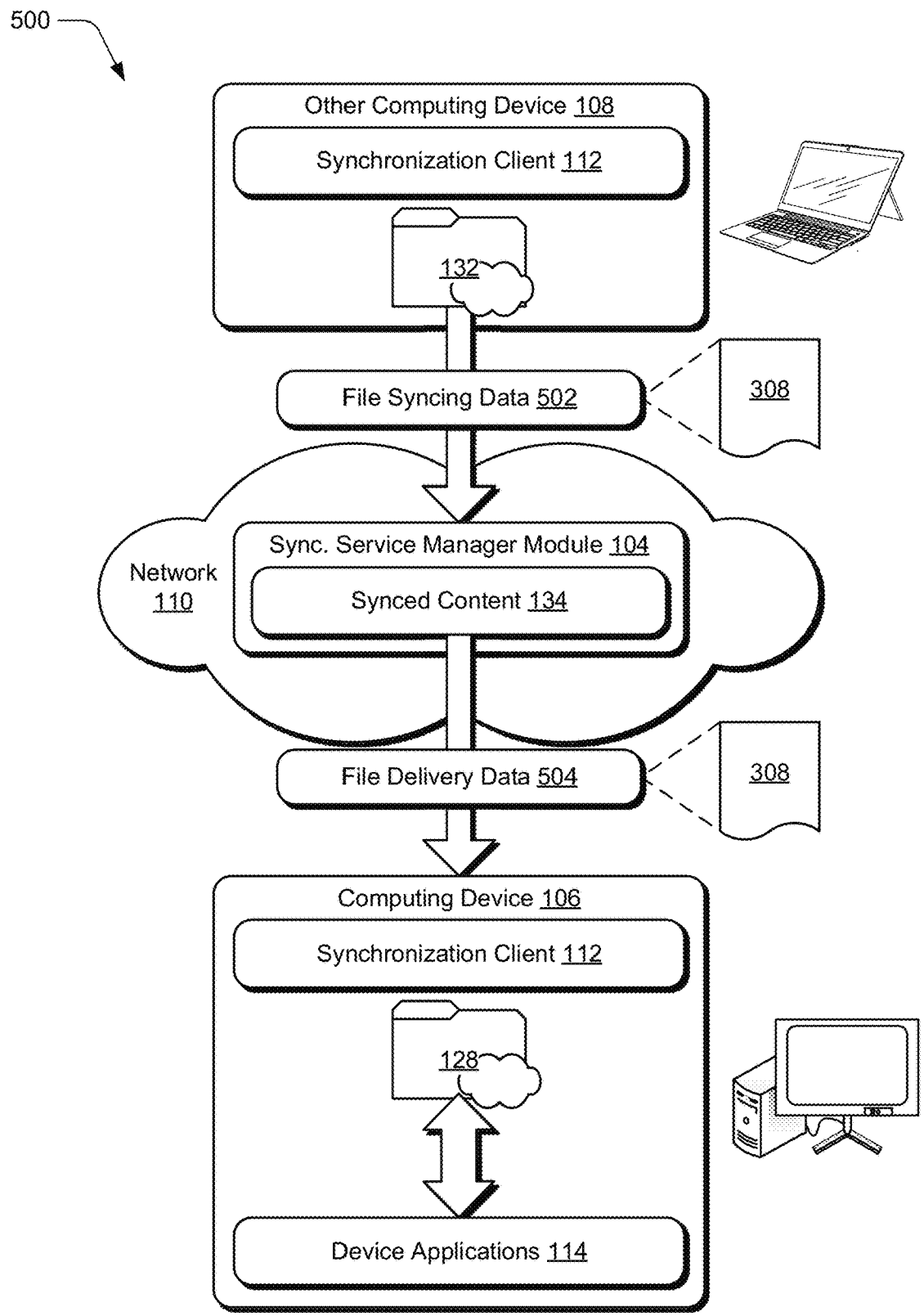
FIG. 5 depicts an example implementation in which a synchronization service manager of FIG. 1 uses recent file tags to pull a requested file initially located in an unsynchronized directory of one device to a different device.

FIG. 5 depicts an example implementation 500 in which a synchronization service manager of FIG. 1 uses recent file tags to pull a requested file initially located in an unsynchronized directory of one device to a different device. Like the illustrated example 300, the illustrated example 500 includes from FIG. 1, the SS manager module 104, the computing device 106 having the synchronization client 112, and the other computing device 108 having the synchronization client 112. The illustrated example 500 represents a continuation of the illustrated example 300. This is illustrated through inclusion of the requested file 308, which in the illustrated example 300 was initially located in the unsynchronized directories 130 of the other computing device 108 before being copied to the synchronized directories 132. In general, discussion of the illustrated example 500 begins with the requested file being located in the synchronized directories 132.

The synchronization client 112 interacts with the SS manager module 104 to synchronize the synchronized directories 132 with the synced content 134. In the illustrated example 500, the synchronization client 112 of the other computing device 108 communicates to the SS manager module 104 file syncing data 502, which includes the requested file 308. Responsive to receiving the file syncing data 502, the SS manager module 104 may add the requested file 308 to the synced content 134.

The SS manager module 104 can then interact with the synchronization client 112 of the computing device 106 to synchronize the synced content 134 with the synchronized directories 128—effective to copy the requested file 308 to the computing device 106. To do so, the SS manager module 104 may communicate to the computing device 106 file delivery data 504, which includes the requested file 308. Responsive to receiving the file delivery data 504, the synchronization client 112 may deposit the requested file 308 in the synchronized directories 128 of the computing device 106. The synchronization client 112 may move the requested file 308 to other directories of the computing device 106 (such as the unsynchronized directories 126) without departing from the spirit or scope of the techniques described herein. In any case, after the requested file 308 is delivered to the computing device 106, the requested file 308 may be accessed by the device applications 114. In scenarios where the requested file 308 is requested via a particular device application 114, for instance, the requested file 308 may simply be opened in the particular application when received. In this way, a user can easily access different files on different devices. This may be advantageous when a first device of a user has an application suited for a task that a second device of the user does not have, such that the user cannot perform the task using the second device or cannot perform it as easily as on the second device.

In addition to enabling a user to access files on a first device from unsynchronized directories of at least a second device, the described techniques also enable file sharing among multiple users. In particular, the described technique enable file sharing between multiple users in a way that does not involve maintaining copies of shared files at a server before the files are requested. Rather, a shared file may be uploaded to the server after a request for the file is received. Multi-user implementations may involve maintaining a repository of tags at a server for files that are designated for sharing. This may be similar to the manner in which the single-user cross-device file access of FIGS. 3 and 5 is implemented using the recent file tags 136. In this context, consider the example implementation of FIG. 6.

Figure 6:
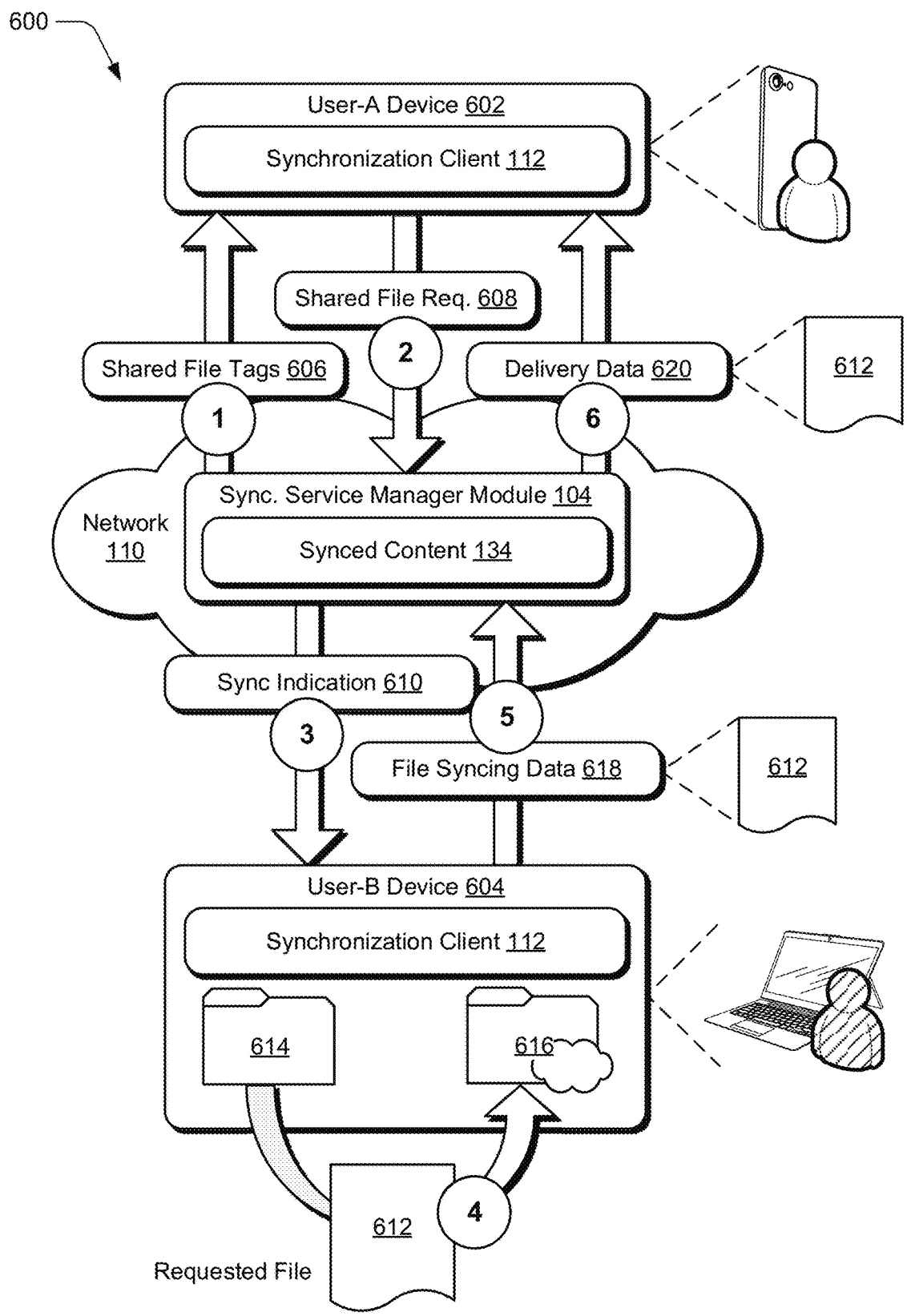
FIG. 6 depicts an example implementation in which a synchronization service manager of FIG. 1 uses file tags to pull a file from a computing device of a first user to a computing device of a second user.

FIG. 6 depicts an example implementation 600 in which a synchronization service manager of FIG. 1 uses file tags to pull a file from a computing device of a first user to a computing device of a second user. The illustrated example 600 includes from FIG. 1 the SS manager module 104 having synced content 134. The illustrated example 600 also includes the network 110, which enables the SS manager module 104 to implement aspects of request-driven shared file pulling between User-A device 602 and User-B device 604.

In accordance with one or more implementations, the SS manager module 104 may include tags for files that User-B has selected to share from the User-B device 604. In the scenario illustrated in FIG. 6, User-A and User-B are different users, e.g., User-A and User-B may be associated with different user identifiers 204 indicative of different user names, different biometric information, and so forth. This difference in users is represented via the fill of the user depictions proximate the illustrated User-A device 602 and User-B device 604. In particular, the user depiction proximate the User-A device 602 has a solid white fill (or no fill) and the user depiction proximate the User-B device 604 has a hashed fill. Additionally, the User-A device 602 and the User-B device 604 are depicted as different devices—the User-A device 602 is depicted as a mobile phone and the User-B device 604 is depicted as a laptop or as a tablet with an attached keyboard.

To enable the User-A device 602 to obtain files from the User-B device 604 without making server copies of the files until after requests to pull the files are received, the SS manager module 104 initially communicates shared file tags 606 to the User-A device 602. Each of the shared file tags 606 may be configured in a similar manner as the recent file tag 202, e.g., having metadata for attributes that enable a requested file to be pulled from the directories of the User-B device 604. This can include metadata for attributes such as the file identifier 206, the file name 208, the device identifier 210 (of the User-B device 604), and so on. The shared file tags 606 enable the synchronization client 112 to cause a list of the shared files to be presented to User-B, such as via an application of the User-A device 602. In one or more implementations, the list of shared files may be presented via a user interface similar to the example user interface of FIG. 4, which lists one or more devices and files available for pulling from the listed devices. Further, the user interface allows User-A to select which shared files he or she would like to pull from the User-B device 604.

Responsive to a selection by User-A, the synchronization client 112 generates shared file request 608 to indicate the files selected for pulling from the User-B device 604. After the shared file request 608 is received, the SS manager module 104 generates synchronization indication 610 and communicates it over the network 110 to the User-B device 604. Broadly speaking, the synchronization indication 610 may be configured to indicate to the synchronization client 112 of the User-B device 604 the one or more files requested by User-A, e.g., it may include at least the file path 214 from the recent file tag 202 of the requested files. The synchronization indication 610 is also configured to indicate to the synchronization client 112 of the User-B device 604 to initiate synchronization of requested file 612. Based on the synchronization indication 610, the synchronization client 112 locates the requested file 612. In the illustrated example, the requested file 612 is located in unsynchronized directories 614 of the User-B device 604. Accordingly, the synchronization client 112 copies the requested file 612 from the unsynchronized directories 614 to synchronized directories 616.

Once the requested file 612 is copied to the synchronized directories 616, the synchronization clients 112 and the SS manager module 104 may perform operations to pull the file to the User-A device 602. In particular, the synchronization client 112 of the User-B device 604 may communicate file syncing data 618 to the SS manager module 104 over the network 110. In accordance with the illustrated example 600, the file syncing data 618 includes the requested file 612. Once received, the requested file 612 may be added to the synced content 134. The SS manager module 104 may then synchronize the synced content 134 with the User-A device 602—effective to deposit a copy of the requested file 612 at the User-A device 602. In the illustrated example, the SS manager module 104 communicates delivery data 620 over the network 110 to the User-A device 602. In accordance with the describe techniques, the delivery data 620 includes the requested file 612.

After the requested file 612 is delivered to the User-A device 602, the requested file 612 may be accessed by applications of the User-A device 602. By way of example, an application of the User-A device 602 can be used to interact with the requested file from local storage, such as to view or otherwise consume the requested file 612, modify the requested file 612, and so forth. By waiting to send a copy of the requested file 612 until after the shared file request 608, the described technique may reduce an amount of server storage used in connection with file sharing techniques. Indeed, once the requested file 612 is delivered to the User-A device 602, the copy made in the synced content 134 may be deleted. In the single-user cross-device implementations previously described, the files copied to the synced content 134 may also be deleted from the synced content 134 once delivered.

Having discussed example details of the techniques for request-driven file pulling from unsynchronized directories, consider now some example procedures to illustrate additional aspects of the techniques.

Example Procedures

This section describes example procedures for request-driven file pulling from unsynchronized directories in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the service provider system 102 of FIG. 1 that makes use of a synchronization service manager module 104 (SS manager module 104) or the computing device 106 and the other computing device 108, which make use of the synchronization client 112.

Figure 7A:
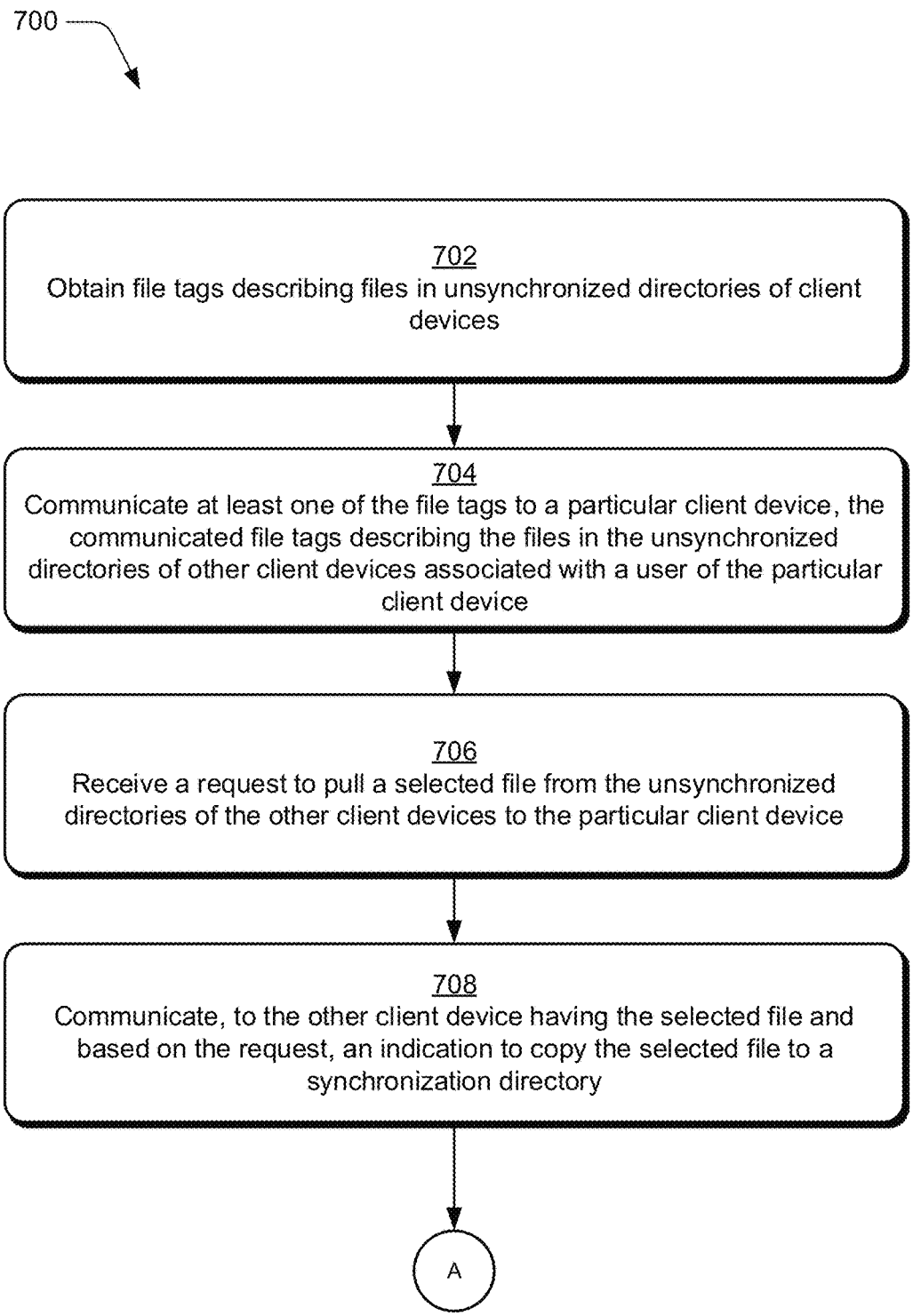
FIGS. 7A and 7B depict a procedure in an example implementation in which a file is pulled from an unsynchronized directory of a first client device of a user to a second client device of the user after the file is requested.
Figure 7B:
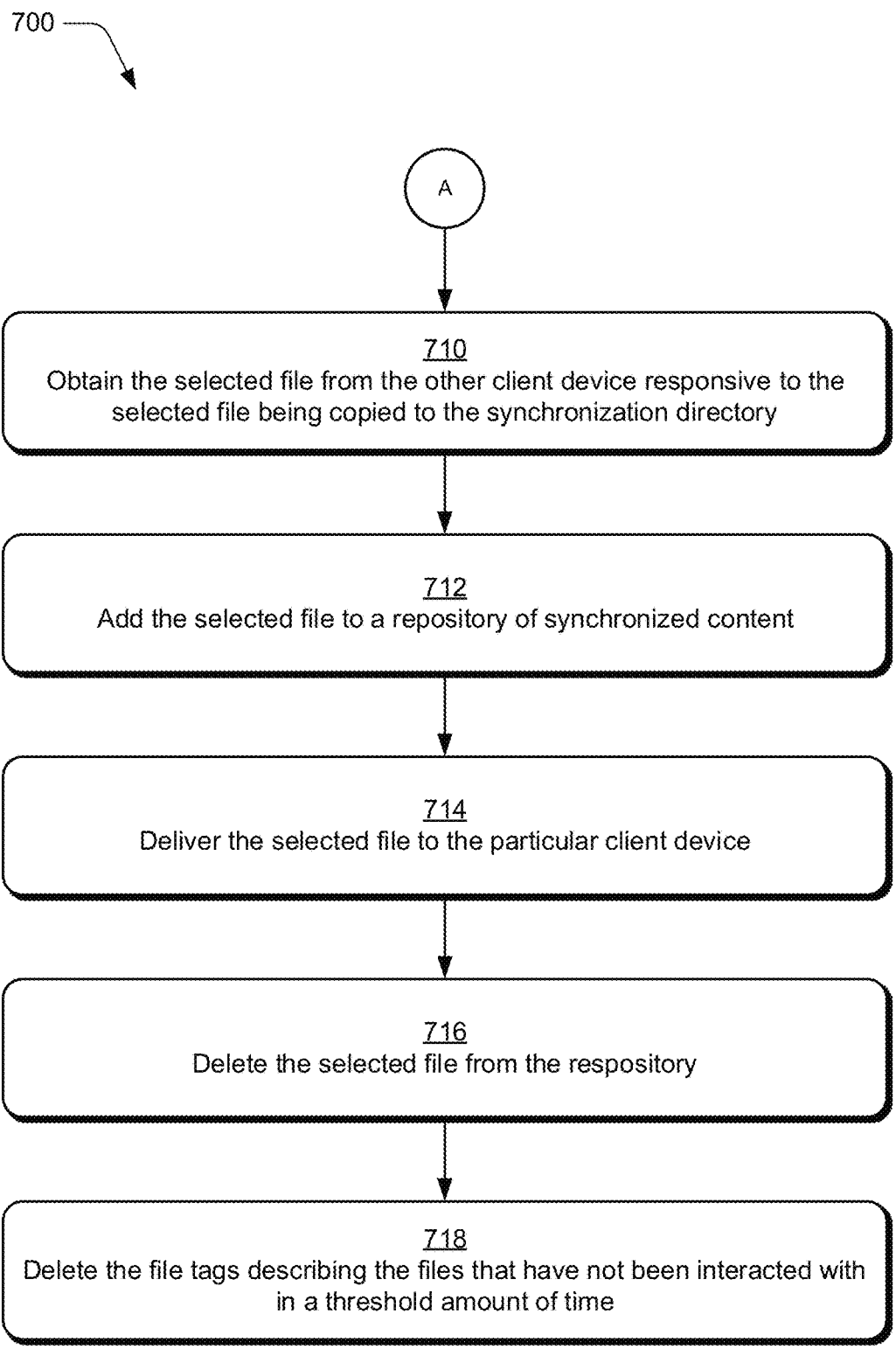

FIGS. 7A and 7B depict an example procedure 700 in which a file is pulled from an unsynchronized directory of a first client device of a user to a second client device of the user after a request for the file is received. File tags are obtained that describe files in unsynchronized directories of client devices (block 702). By way of example, the SS manager module 104 obtains a recent file tag 202 each time a user of the computing device 106 and the other computing device 108 interacts with files in the unsynchronized directories 126, 130. These recent file tags 202 are generated by the synchronization client 112 to describe file interactions in terms of the attributes of the recent file tag 202. The SS manager module 104 maintains a repository of the obtained file tags at the service provider system 102, such as the recent file tags 136, to enable request-driven file pulling from unsynchronized directories. The SS manager module 104 maintains the recent file tags 136 without maintaining the actual files at the service provider system 102 to which those tags correspond.

At least one of the file tags is communicated to a particular client device (block 704). In accordance with the principles discussed herein, the communicated file tags describe files that are in the unsynchronized folders of other client devices associated with a user of the particular client device. By way of example, the SS manager module 104 communicates the pushed file tags 302 via the network 110 to the computing device 106. In this example, the pushed file tags 302 include at least one recent file tag 202 that describes a file in the unsynchronized directories 130 of the other computing device 108. Further, the other computing device 108 is associated with a same user as the computing device 106. Accordingly, the user identifier 204 the pushed file tag identifies the user of these devices. Additionally, the device identifier 210 of the file tag identifies the other computing device 108 and the file path 214 indicates a location in the unsynchronized directories 130 of the other computing device 108. In any case, the pushed file tags 302 enable generation of a selectable list of files that a user of the computing device 106 can select to have pulled to the computing device 106. As an example of the selectable list that can be presented at the computing device 106, consider the user interface component 402 of FIG. 4.

A request is received to pull a selected file from the unsynchronized directories of the other client devices to the particular client device (block 706). By way of example, the SS manager module 104 receives the file request 304. In the context of FIGS. 3 and 4, the synchronization client 112 of the computing device 106 generates the file request 304 responsive to a user selection of a presented file and selection of the pull button 424. An indication to copy the selected file to a synchronization directory is communicated to the other client device (block 708). In accordance with the principles discussed herein, the indication is communicated based on the received request. By way of example, the SS manager module 104 communicates the synchronization indication 306 to the other computing device 108 based on the file request 304. By waiting to synchronize a requested file until after a request for the file is received, the described techniques may reduce storage demands on synchronization services—there is no need to maintain a "server" copy of files for sharing across devices. The procedure 700 continues at 'A' from FIG. 7A to FIG. 7B.

The selected file is obtained from the other client device responsive to the selected file being copied to the synchronization directory (block 710). By way of example, the SS manager module 104 obtains the file syncing data 502 from the other computing device 108 where the file syncing data 502 includes the requested file 308. The requested file 308 is obtained responsive to the synchronization client 112 of the other computing device 108 copying the requested file 308 to the synchronized directories 132 from the unsynchronized directories 130. In one or more implementations, the synchronization client 112 does not copy the requested file 308 over to the synchronized directories 132 until the synchronization indication 306 (responsive to the file request 304) is received. Once the requested file 308 is in the synchronized directories 132, the synchronization client 112 can communicate the requested file 308 over the network 110 to the SS manager module 104. Alternately, the SS manager module 104 can pull the requested file 308 from the synchronized directories 132.

The selected file is added to a repository of synchronized content (block 712). By way of example, the SS manager module 104 adds the requested file to the synced content 134. The selected file is delivered to the particular client device (block 714). By way of example, the SS manager module 104 communicates the file delivery data 504 to the computing device 106. As the file delivery data 504 includes the requested file 308 this communication is effective to deliver the requested file to the computing device 106.

The selected file is deleted from the repository of synchronized content (block 716). By way of example, the SS manager module deletes the copy of the requested file 308 that was added to the synced content 134 at block 712. The obtained file tags are deleted that describe files which have not been interacted with in a threshold amount of time (block 718). By way of example, the SS manager module 104 deletes from the recent file tags 136 any recent file tag 202 having a timestamp 218 that is not within the threshold amount of time—the timestamp 218 attribute of the recent file tags 136 is generally updated to reflect a most recent interaction with a respective file.

Figure 8:
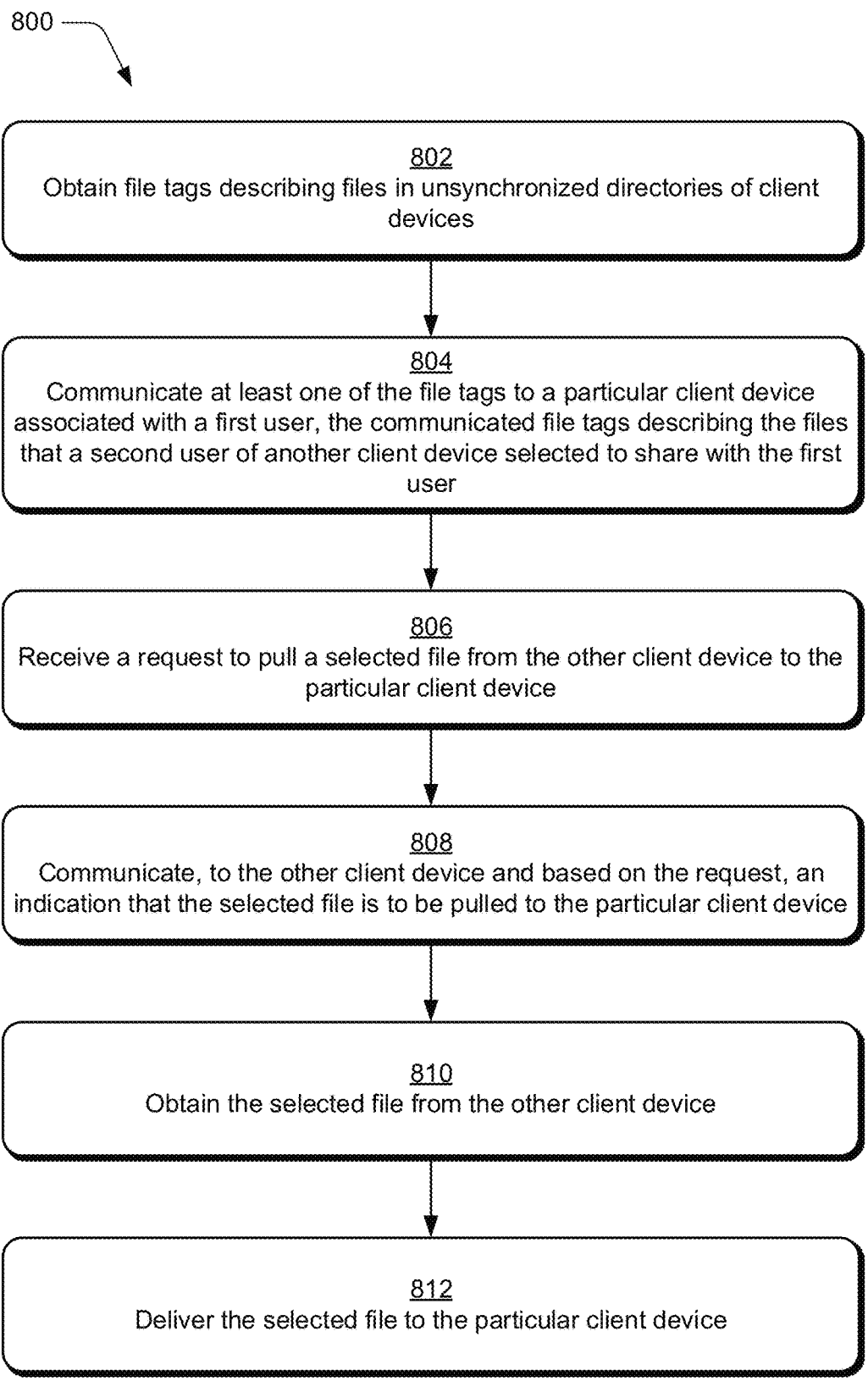
FIG. 8 depicts a procedure in an example implementation in which a shared file is pulled from an unsynchronized directory of a client device of a first user to a different client device of a second user after the file is requested.

FIG. 8 depicts an example procedure 800 in which a shared file is pulled from an unsynchronized directory of a client device of a first user to a different client device of a second user after a request for the file is received. File tags are obtained that describe files in unsynchronized directories of client devices (block 802). By way of example, the SS manager module 104 obtains a recent file tag 202 when User-B of the User-B device 604 interacts with files in the unsynchronized directories 614. These recent file tags 202 are generated by the synchronization client 112 of the User-B device 604 to describe file interactions in terms of the attributes of the recent file tag 202. The SS manager module 104 maintains a repository of the obtained file tags at the service provider system 102, such as the recent file tags 136, to enable request-driven pulling of files shared between different users from unsynchronized directories. The SS manager module 104 maintains these tags of the shared files without maintaining the actual files at the service provider system 102 to which those tags correspond.

At least one of the file tags is communicated to a particular client device associated with a first user (block 804). In accordance with the principles discussed herein, the communicated file tags describe files that a second user of another client device has selected to share with the first user. By way of example, the SS manager module 104 communicates the shared file tags 606 via the network 110 to the User-A device 602. In this example, the shared file tags include a file tag 202 that describes a file in the unsynchronized directories 614 of the User-B device 604. As described above, the User-A device 602 is associated with a first user, User-A, and the User-B device 604 is associated with a second user, User-B. Additionally, the device identifier 210 of at least one of the shared file tags 606 identifies the User-B device 604 and the file path 214 indicates a location in the unsynchronized directories 614 of the User-B device 604. In any case, the shared file tags 606 enable generation of a selectable list of files, including the files that User-B has selected to share with User-A. This selectable list indicates files that User-A can select to have pulled from the User-B device.

A request is received to pull a selected file from the second user's client device to the first user's client device (block 806). By way of example, the SS manager module 104 receives the shared file request 608 from the User-A device 602. An indication that the selected file is to be pulled to the first user's client device is communicated to the second user's client device based on the request (block 808). By way of example, the SS manager module 104 communicates the synchronization indication 610 to the User-B device 604 based on the shared file request 608. By waiting to synchronize a shared file until after a request for the file is received, the described techniques may reduce storage demands on synchronization services—there is no need to maintain "server" copies of files for sharing between different users.

The selected file is obtained from the second user's client device (block 810). By way of example, the SS manager module 104 obtains from the User-B device 604 the file syncing data 618, which includes the requested file 612. The requested file 612 is obtained responsive to the synchronization client 112 of the User-B device 604 copying the requested file 612 to the synchronized directories 616 from the unsynchronized directories 614. The selected file is delivered to the first user's client device (block 812). By way of example, the SS manager module 104 delivers to the User-A device 602 the delivery data 620, which includes the requested file 612. Once the requested file 612 is delivered at block 812, User-A can interact with the requested file 612 by leveraging the functionality of the User-A device 602.

Having described example procedures in accordance with one or more implementations, consider now an example system and device that can be utilized to implement the various techniques described herein.

Example System and Device

Figure 9:
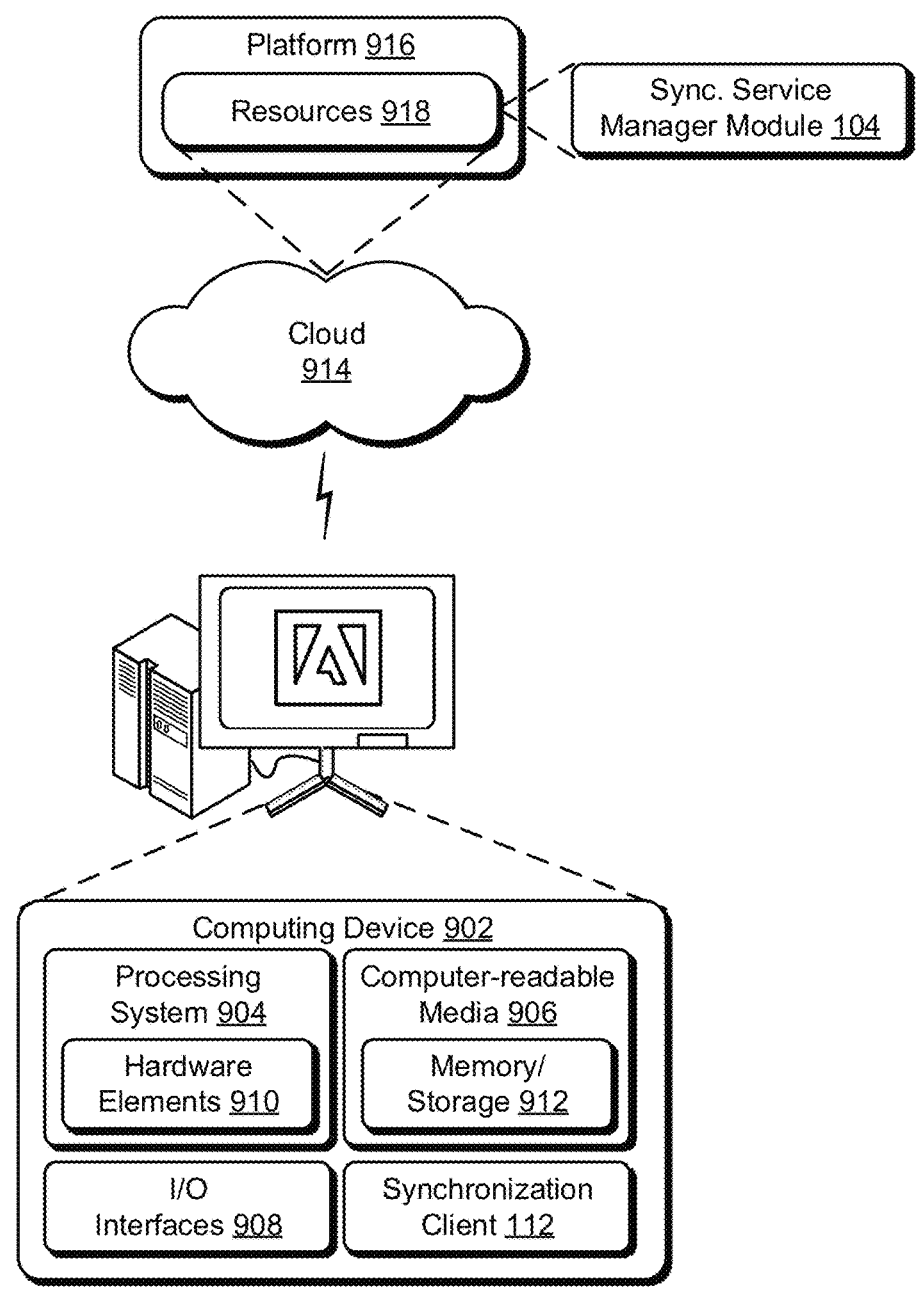
FIG. 9 illustrates an example system including various components of an example device that can be implemented as any type of computing device as described and/or utilized with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the SS manager module 104 and the synchronization client 112. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media.

The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to provide users cross-device access to files in unsynchronized directories, a method implemented by a computing device, the method comprising:
   maintaining, by the computing device, file tags that describe files in unsynchronized directories of multiple devices associated with a user without maintaining copies of the files by the computing device;
   communicating, by the computing device, the file tags to the multiple devices to enable selection of the files for pulling from the unsynchronized directories;
   receiving, by the computing device and from a first device of the multiple devices, a user request to pull a selected one of the files from an unsynchronized directory of a second device of the multiple devices to the first device;
   responsive to receiving the user request, communicating, by the computing device and to the second device, an indication of the user request to pull the selected file from the unsynchronized directory, the indication causing a synchronization client of the second device to copy the selected file from the unsynchronized directory to a synchronized directory of the second device, the unsynchronized directory being different from the synchronized directory;
   responsive to the selected file being copied, obtaining, by the computing device, the copied file from the synchronized directory of the second device; and
   delivering, by the computing device, the obtained file to the first device.

2. A method as described in claim 1, further comprising obtaining the file tags responsive to interactions with the files at the multiple computing devices, the interactions including at least one of creating a file, opening a file, modifying a file, or saving modifications made to a file.

3. A method as described in claim 1, wherein each of the file tags includes a timestamp that describes a time of most recent interaction with a respective file.

4. A method as described in claim 3, wherein the file tags maintained by the computing device have timestamps within a threshold of a current time.

5. A method as described in claim 4, further comprising deleting the file tags having timestamps that are not within the threshold of the current time.

6. A method as described in claim 1, further comprising:
adding the obtained file to a repository of synchronized content maintained by the computing device, the repository including files from synchronized directories of the multiple devices associated with the user; and
delivering the obtained file to the first device by synchronizing the repository of synchronized content with a synchronized directory of the first device.

7. A method as described in claim 6, further comprising deleting the obtained file from the repository of synchronized content after the obtained file is delivered to the first device.

8. A method as described in claim 6, further comprising obtaining the copied file from the second device by synchronizing the synchronized directory of the second device with the repository of synchronized content.

9. A method as described in claim 1, wherein each of the file tags includes a product code that describes an application used to most recently interact with a respective file.

10. A method as described in claim 9, wherein:
the file tags enable presentation of the files for selection via applications of the multiple devices; and
the presented files are limited based on the product code to the files interacted with using related applications of a particular application presenting the presented files.

11. A method as described in claim 1, wherein each of the file tags includes a file path that describes a file system location of a respective file, the file system location pointing to an unsynchronized directory of one of the multiple devices where the respective file is located.

12. A method as described in claim 11, wherein the indication of the user request includes the file path of the selected file.

13. A method as described in claim 1, further comprising communicating to the first device the file tags having both:
device identifiers that identify the other devices associated with the user; and
user identifiers that identify the user.

14. A method as described in claim 1, wherein the computing device is configured as a server device of a service provider.

15. In a digital medium environment to share files in unsynchronized directories with other users, a method implemented by a computing device, the method comprising:
maintaining, by the computing device, file tags that describe files in an unsynchronized directory of a first user device that a first user has selected to share with a second user, the file tags being maintained without the computing device maintaining copies of the file;
communicating, by the computing device, the file tags to a second user device associated with the second user to enable selection of the shared files for pulling to the second user device from the unsynchronized directory of the first user device;
receiving, by the computing device, a user request to pull a selected one of the files from the unsynchronized directory of the first user device to the second user device;
responsive to receiving the user request, communicating, by the computing device and to the first user device, an indication of the user request to pull the selected file from the unsynchronized directory, the indication causing a synchronization client of the first user device to copy the selected file from the unsynchronized directory to a synchronized directory of the first user device, the unsynchronized directory being different from the synchronized directory;
responsive to the selected file being copied, obtaining, by the computing device, the copied file from the synchronized directory of the first user device; and
delivering, by the computing device, the obtained file to the second user device.

16. A method as described in claim 15, further comprising:
maintaining a repository of synchronized content that includes files from the synchronized directory of the first user device; and
obtaining the copied file from the first user device by synchronizing the synchronized directory of the first user device with the repository of synchronized content.

17. A method as described in claim 16, further comprising delivering the obtained file to the second user device by synchronizing at least a portion of the repository of synchronized content with at least a portion of a synchronized directory of the second user device.

18. A method as described in claim 15, wherein the copied file is not obtained from the first user device until after the user request is received.

19. A device comprising:
at least one processor; and
memory having stored thereon computer-readable instructions that are executable by the at least one processor to perform operations for providing access to files in unsynchronized directories of other devices associated with a user of the device, the operations comprising:
obtaining, from a service provider, file tags that describe files in the unsynchronized directories of the other devices associated with the user;
presenting, based on the obtained file tags, indications of the files that are selectable for pulling to the device;
receiving a user selection via a user interface and selecting one of the files the indications indicate is selectable for pulling from the unsynchronized directories;
responsive to the user selection via the user interface, communicating a request to the service provider to pull the selected file from an unsynchronized directory of a respective other device according to the file tags, the service provider configured to wait until after the user selection to send the request to the respective other device, the request configured to cause a synchronization client of the respective other device to copy the selected file from the unsynchronized directory to a synchronized directory of the respective other device for synchronization with the service provider; and
obtaining the selected file from the service provider.

20. A device as described in claim 19, wherein each of the file tags corresponds to a respective file and is configured with attributes including at least one of:
- a user identifier that uniquely identifies the user;
- a file identifier that uniquely identifies the respective file;
- a file name that indicates a string of characters serving as a name of the respective file;
- a device identifier that uniquely identifies one of the devices associated with the user where the respective file is located;
- a device name that indicates a string of characters serving as a name for the device where the respective file is located;
- a file path that specifies a unique file system location of the respective file at the device where the respective file is located;
- a product code that indicates an application used most recently to interact with the respective file;
- a timestamp that indicates a time of most recent interaction with the respective file; or
- a thumbnail indicative of the content of the respective file.

* * * * *